(12) United States Patent
Grout et al.

(10) Patent No.: US 9,292,064 B2
(45) Date of Patent: Mar. 22, 2016

(54) CHANGING OUTPUT POWER TO BE WITHIN A RANGE BASED ON A POWER USE EFFICIENCY PEAK

(71) Applicant: Lenovo Enterprise Solutions (Singapore) Pte. Ltd., Singapore (SG)

(72) Inventors: Gordon B. Grout, Rochester, MN (US); Mark R. Vanderwiel, Rochester, MN (US)

(73) Assignee: LENOVO ENTERPRISE SOLUTIONS (SINGAPORE) PTE. LTD., Singapore (SG)

(*) Notice: Subject to any disclaimer, the term of this patent is extended or adjusted under 35 U.S.C. 154(b) by 216 days.

(21) Appl. No.: 14/030,334

(22) Filed: Sep. 18, 2013

(65) Prior Publication Data
US 2015/0082055 A1  Mar. 19, 2015

(51) Int. Cl.
*G06F 1/32* (2006.01)
*G06F 1/26* (2006.01)

(52) U.S. Cl.
CPC *G06F 1/26* (2013.01); *G06F 1/263* (2013.01); *G06F 1/3206* (2013.01)

(58) Field of Classification Search
None
See application file for complete search history.

(56) References Cited

U.S. PATENT DOCUMENTS

| | | | |
|---|---|---|---|
| 5,809,532 | A | 9/1998 | Eno et al. |
| 7,895,455 | B2 | 2/2011 | Green et al. |
| 2005/0028017 | A1 | 2/2005 | Janakiraman et al. |
| 2005/0184984 | A1* | 8/2005 | Kim ............... G06F 1/305 345/211 |
| 2006/0149975 | A1* | 7/2006 | Rotem et al. ........... 713/300 |
| 2007/0046281 | A1* | 3/2007 | Domingo et al. ........ 324/142 |
| 2008/0320322 | A1 | 12/2008 | Green et al. |
| 2009/0271649 | A1 | 10/2009 | Loffink et al. |
| 2010/0164292 | A1 | 7/2010 | Freeman et al. |
| 2011/0320838 | A1 | 12/2011 | Jenne |
| 2012/0096248 | A1 | 4/2012 | McCarthy |

FOREIGN PATENT DOCUMENTS

WO   WO 2011015451 A1   2/2011

OTHER PUBLICATIONS

James E. Hanson, et al., Multi-Aspect Hardware Management in Enterprise Server Consolidation, 2010 IEEE/IFIP Network Operations and Management Symposium—NOMS 2010, 2010, pp. 543-550.
Search Report and Written Opinion for related PCT application No. PCT/EP2014/065935 dated Apr. 14, 2015, 11 pages.

\* cited by examiner

*Primary Examiner* — Paul Yanchus, III
(74) *Attorney, Agent, or Firm* — Katherine S. Brown; Andrew M. Calderon; Roberts Mlotkowski Safran & Cole, P.C.

(57) ABSTRACT

If a total output power provided to a computer is less than a minimum of a power capacity range around a power use efficiency peak, and the occurrence of the total output power being less than the minimum value occurs more than a first threshold number of times within a time period, a first action is performed that causes the total output power provided to the computer to change to exceed the minimum of the power capacity range. If the total output power provided to the computer is greater than a maximum of the power capacity range, and the occurrence of the total output power being greater than the maximum occurs more than a second threshold number of times within the time period, a second action is performed that causes the total output power provided to the computer to change to be less than the maximum of the power capacity range.

14 Claims, 9 Drawing Sheets

| | | 142 |
|---|---|---|
| | POWER SUPPLY DATA | |

| MAKE/ MODEL (610) | EFFICIENCY CURVE (LOADING, EFFICIENCY) (612) | ENABLED (614) | REDUNDANT (616) |
|---|---|---|---|
| MAKE A/ MODEL A | (10%, 85.3%)<br>(20%, 88.71%)<br>(50%, 92.29%)<br>(100%, 89.15%) | YES | NO |
| MAKE B/ MODEL B | (10%, 84.8%)<br>(20%, 88.9%)<br>(50%, 89.1%)<br>(100%, 86.2%) | NO | YES |
| MAKE C/ MODEL C | (10%, 74.8%)<br>(20%, 78.9%)<br>(50%, 79.1%)<br>(100%, 76.2%) | YES | NO |

TOTAL OUTPUT POWER CAPACITY RANGE (MINIMUM AND MAXIMUM) — 620

622 — NUMBER OF POWER SUPPLIES IN SYSTEM

628 — RANGE THRESHOLDS (MINIMUM AND MAXIMUM)

630 — FIRST THRESHOLD NUMBER OF TIMES

632 — SECOND THRESHOLD NUMBER OF TIMES

FIG. 6

CHANGING OUTPUT POWER TO BE WITHIN A RANGE BASED ON A POWER USE EFFICIENCY PEAK

FIELD

An embodiment of the invention generally relates to computer systems that receive electrical power from power supplies that have efficiency curves.

BACKGROUND

Computer systems typically comprise a combination of hardware (such as semiconductors, transistors, chips, and circuit boards) and computer programs that the hardware stores and executes. The computer systems provide electrical power to the hardware via power supplies, often implemented as AC (Alternating Current) to DC (Direct Current) converters.

Computer systems typically have several power supplies connected in parallel or in series for capacity and redundancy reasons. The computer system needs power from the power supplies that is sufficient to provide the power consumed by the computer when it is operating with a maximum workload, which uses more power than a smaller workload. Additionally, for fault tolerance and high availability reasons, computer systems often have additional or redundant power supplies, so that if one or more power supplies fail, sufficient power capacity still exists to meet the needs of the computer system. Some computer systems have full redundancy, with one set of power converters connected to one source of AC and another set of converters connected to a separate source of AC, so that a failure in one of the AC systems does not compromise operation of the computer system.

The power supplies have an efficiency rating, which describes how much input power the power supplies need to supply a specific output power. For example, a power supply that has an 80% efficiency rating at 100 W (Watts) output power requires 100 W/80%=125 W of input power to attain that output. Efficiency ratings are typically neither linear nor uniform. Instead, efficiency ratings are typically curves that increase in efficiency from a lower power, peak at a high power, and then decrease to a maximum power output.

SUMMARY

A method, computer-readable storage medium, and computer system are provided. In an embodiment, a power capacity range around a power use efficiency peak of a computer system is determined. If a total output power provided to the computer system is less than a minimum value of the power capacity range, and the occurrence of the total output power being less than the minimum value occurs more than a first threshold number of times within a time period, a first action is performed that causes the total output power provided to the computer system to change to exceed the minimum value of the power capacity range. If the total output power provided to the computer system is greater than a maximum value of the power capacity range, and the occurrence of the total output power being greater than the maximum value occurs more than a second threshold number of times within the time period, a second action is performed that causes the total output power provided to the computer system to change to be less than the maximum value of the power capacity range.

BRIEF DESCRIPTION OF THE SEVERAL VIEWS OF THE DRAWINGS

FIG. 6 depicts a block diagram of power supply data, according to an embodiment of the invention.

It is to be noted, however, that the appended drawings illustrate only example embodiments of the invention, and are therefore not considered a limitation of the scope of other embodiments of the invention.

DETAILED DESCRIPTION

Figure 1:
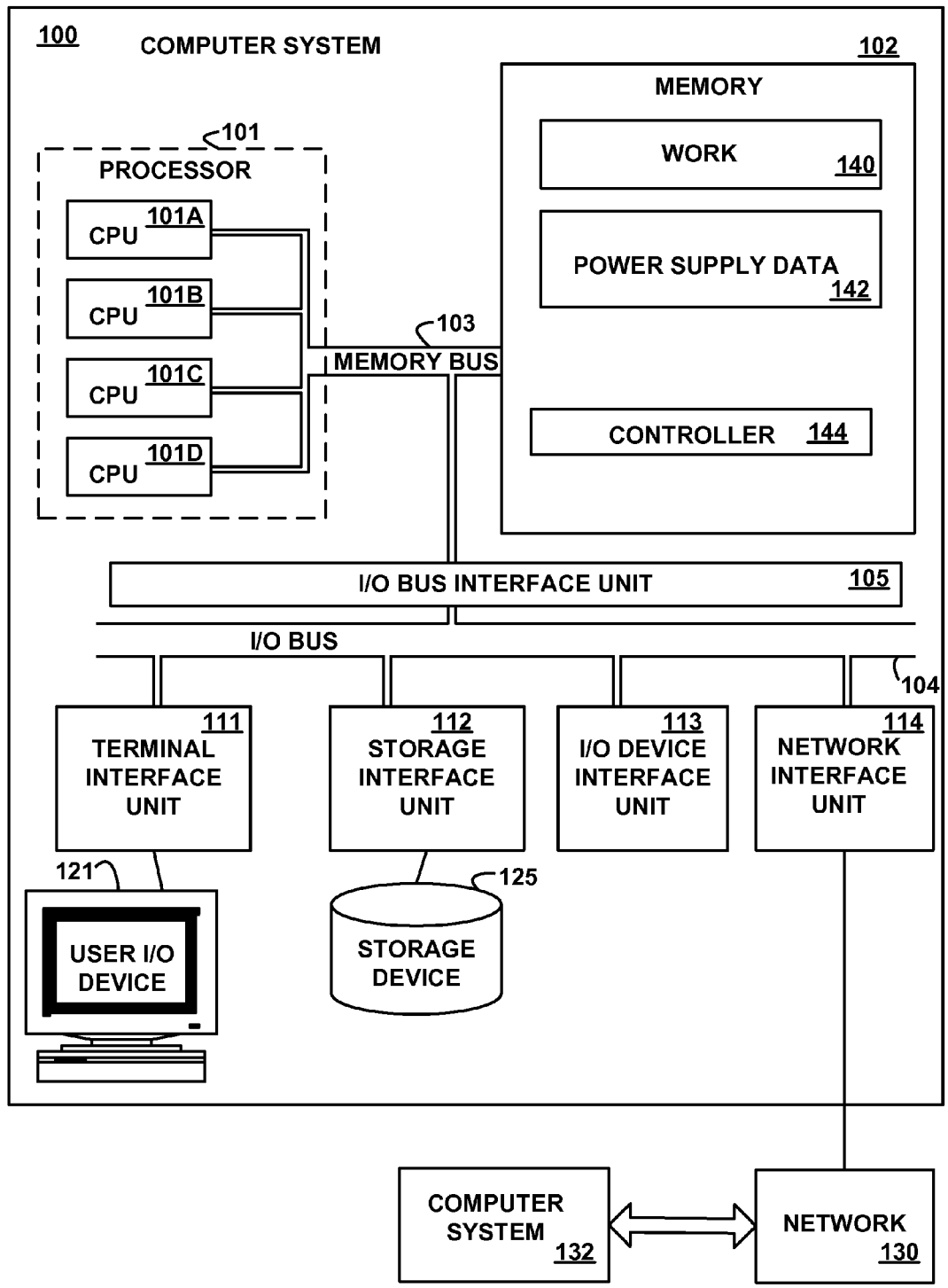
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a computer system 132 via a network 130, according to an embodiment of the present invention. The mechanisms and apparatus of embodiments of the present invention apply equally to any appropriate computing system. The major components of the computer system 100 comprise one or more processors 101, memory 102, a terminal interface unit 111, a storage interface unit 112, an I/O (Input/Output) device interface unit 113, and a network interface unit 114, all of which are communicatively coupled, directly or indirectly, for inter-component communication via a memory bus 103, an I/O bus 104, and an I/O bus interface unit 105.

The computer system 100 comprises one or more general-purpose programmable central processing units (CPUs) 101A, 101B, 101C, and 101D, herein generically referred to as the processor 101. In an embodiment, the computer system 100 comprises multiple processors typical of a relatively large system; however, in another embodiment the computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium (either volatile or non-volatile) for storing or encoding data and programs. In another embodiment, the memory 102 represents the entire virtual memory of the computer system 100, and may also include the virtual memory of other computer systems coupled to the computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 is illustrated as comprising, storing, or encoding work 140, power supply data 142, and a controller 144. Although the work 140, the power supply data 142, and the controller 144 are illustrated as being stored within the memory 102 in the computer system 100, in other embodiments some or all of them may be on different computer systems and may be accessed remotely, e.g., via the network 130. Further, the computer system 100 may use virtual addressing mechanisms that allow the programs of the computer system 100 to behave as if they only have access to a large, single storage entity instead of access to multiple, smaller storage entities. Thus, while the work 140, the power supply data 142, and the controller 144 are illustrated as residing in the memory 102, these elements are not necessarily all completely contained in the same storage device at the same time.

In various embodiments, the work 140 may be implemented as applications, operating systems, virtual machines, or partitions, and the amount, number, and/or type of the work 140 may change dynamically as the controller 144 adds additional work 140 to or removes existing work 140 from the computer 100. The work 140 may comprise instructions that execute on the processor 101. In other embodiments the work 140 comprises requests or commands that are processed by applications executing on the processor 101, and the controller 144 sends requests to the applications for processing or decides to refrain from sending requests to the applications.

In an embodiment, the controller 144 comprises instructions that execute on the processor 101 or statements that are interpreted by instructions executing on the processor 101 to perform the functions as further described below with reference to FIGS. 2, 3, 4, 5, 6, 7, 8, and 9. In another embodiment, the work 140 and/or the controller 144 may be implemented in microcode or firmware. In another embodiment, the controller 144 may be implemented in hardware via logic gates, semiconductor devices, chips, circuits, circuit cards, and/or other physical hardware devices.

The memory bus 103 provides a data communication path or communications fabric for transferring data among the processor 101, the memory 102, and the I/O bus interface unit 105. The I/O bus interface unit 105 is further coupled to the I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the I/O bus 104.

The I/O interface units support communication with a variety of storage and I/O devices. For example, the terminal interface unit 111 supports the attachment of one or more user I/O devices, which may comprise user output devices (such as a video display device, projectors, a speaker, and/or television set) and user input devices (such as a microphone and a speech recognition device, a gesture detection device, a camera, a keyboard, a mouse, a keypad, a touchpad, a trackball, buttons, Radio Frequency Identifier Tags, a light pen, a finger, a stylus, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device. The user I/O device 121 may be of any size and may accommodate multiple users viewing and touching the display device simultaneously or collaboratively, and in an embodiment, any user may touch at any location on the display device.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface unit 113 provides an interface to any of various other input/output devices or devices of other types, such as printers or fax machines. The network interface unit 114 provides one or more communications paths from the computer system 100 to other digital devices and computer systems, e.g., the computer system 132; such paths may comprise, e.g., one or more networks 130.

Although the memory bus 103 is shown in FIG. 1 as a relatively simple, single bus structure providing a direct communication path among the processors 101, the memory 102, and the I/O bus interface unit 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 105 and the I/O bus 104 are shown as single respective units, the computer system 100 may, in fact, comprise multiple I/O bus interface units 105 and/or multiple I/O buses 104. While multiple I/O interface units are shown, which separate the I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable bus, network, or any multiple or combination thereof, and may support any appropriate protocol suitable for communication of data and/or code to/from the computer system 100 and the computer system 132. In various embodiments, the network 130 may represent a storage device or a combination of storage devices, either connected directly or indirectly to the computer system 100 and the computer system 132. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented as an intranet. In another embodiment, the network 130 is implemented as any appropriate cellular data network, cell-based radio network technology, or wireless network. In another embodiment, the network 130 is implemented as any suitable bus, network, or any multiple or combination thereof.

The computer system 132 may comprise some or all of the hardware and program components of the computer system 100.

FIG. 1 is intended to depict the representative major components of the computer system 100, the network 130, and the computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
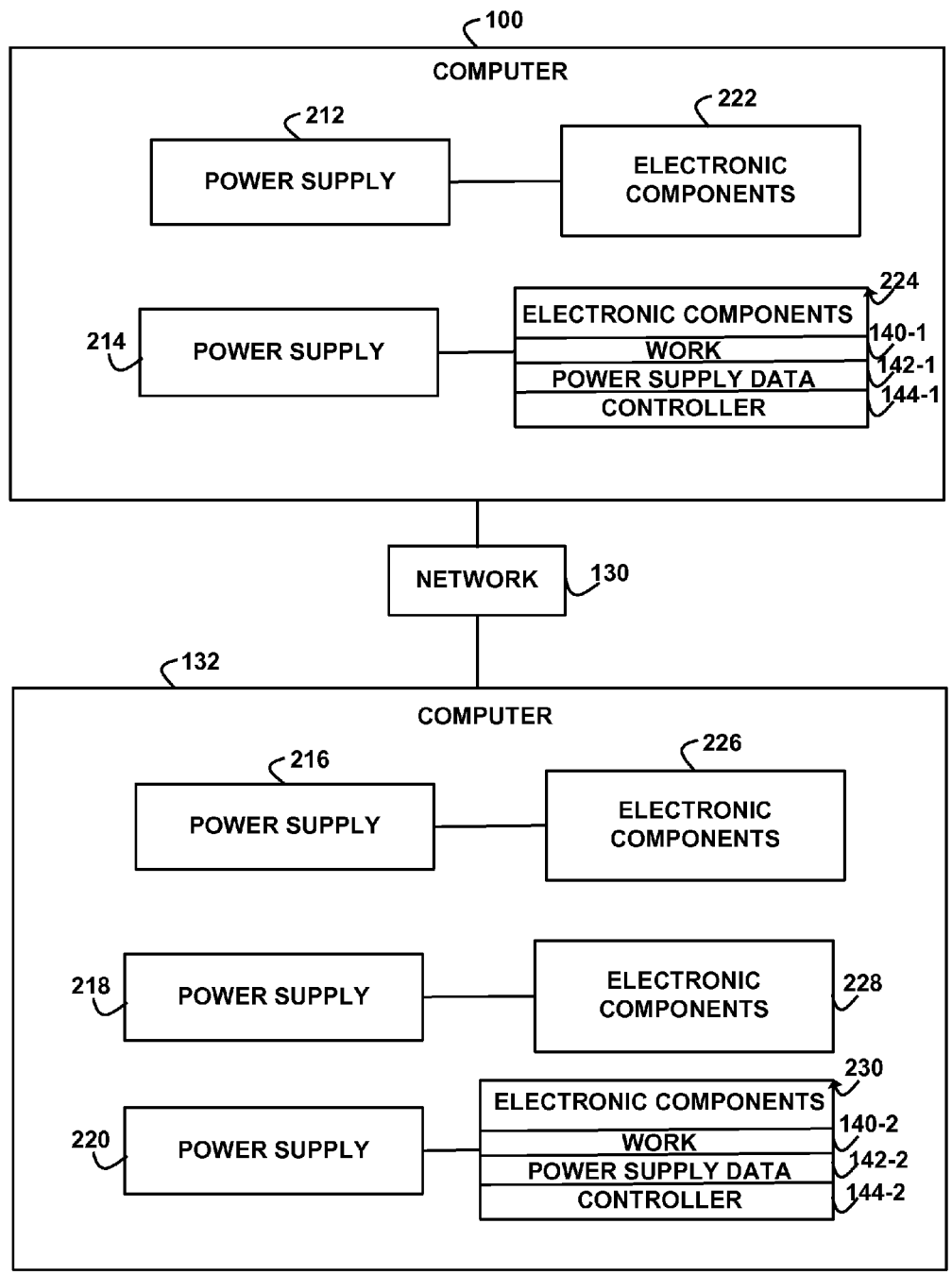
FIG. 2 depicts a high-level block diagram of example computer systems connected via a network, according to an embodiment of the invention.

FIG. 2 depicts a high-level block diagram of an example computer system 100 connected via a network 130 to an example computer system 132, according to an embodiment of the invention, although any number of computer systems may be present. The computer system 100 comprises a power supply 212 connected to electronic components 222 and a power supply 214 connected to electronic components 224. Although the power supply 212 and the power supply 214 are illustrated as being connected to different respective electronic components 222 and 224, in other embodiments, the power supply 212 and the power supply 214 may be connected to the same electronic components, in series or in parallel. The computer system 132 comprises a power supply 216 connected to electronic components 226, a power supply 218 connected to electronic components 228, and a power supply 220 connected to electronic components 230. Although the power supply 216, the power supply 218, and the power supply 2220 are illustrated as being connected to different respective electronic components 226, 228, and 230, in other embodiments, the power supplies 216, 218, and 220 may be connected to the same electronic components, in series or in parallel. In various embodiments, any number of the power supplies 212, 214, 216, 218, and 220 may be present.

The electronic components 224 store the work 140-1, the power supply data 142-1, and the controller 144-1. The electronic components 230 store the work 140-2, the power supply data 142-2, and the controller 144-2. The work 140-1 and 140-2 are examples of, and are generically referred to by, the work 140 (FIG. 1). The power supply data 142-1 and the power supply data 142-2 are examples of, and are generically referred to by, the power supply data 142 (FIG. 1). The controller 144-1 and the controller 144-2 are examples of, and are generically referred to by, the controller 144 (FIG. 1). In various embodiments, the work 140-1 and the work 140-2 may be the same or different from each other. In various embodiments, the power supply data 142-1 and the power supply data 142-2 may be the same or different from each other.

The electronic components 222, 224, 226, 228, and 230 are electrical loads that consume or use electrical power and represent some or all of the processor 101, the memory 102, the memory bus 103, the I/O bus 104, the I/O bus interface unit 105, the terminal interface unit 111, the storage interface unit 112, the I/O device interface unit 113, the network interface unit 114, the user I/O device 121, and/or the storage device 125, as illustrated in FIG. 1. Referring again to FIG. 2, the power supplies 212, 214, 216, 218, and 220 are electrical or electro/mechanical devices that supply electrical power to the electric loads. In various embodiments, the power supplies 212, 214, 216, 218, and/or 220 may be implemented as electric power converters, regulated power supplies, batteries, electrical energy transmission systems, fuel cells, generators, alternators, AC power supplies, DC power supplies, AC/DC power supplies, AC adapters, transformers, switched mode power supplies, programmable power supplies, uninterruptable power supplies, voltage multipliers, or any portion, combination, or multiple, thereof.

Figure 3:
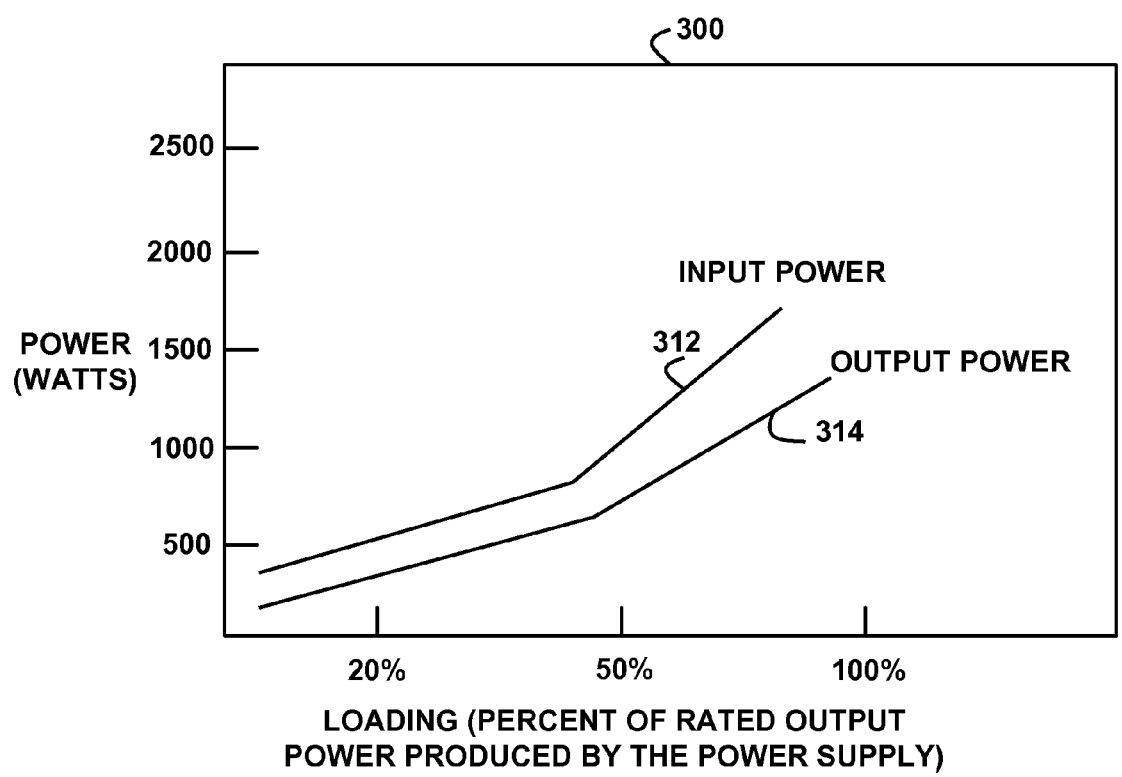
FIG. 3 depicts a graph of a plot of loading data versus power data, according to an embodiment of the invention.

FIG. 3 depicts a graph 300 of a plot of loading data versus power data, according to an embodiment of the invention. The graph 300 represents a grid or a Cartesian coordinate system with an x-axis (horizontal) component and a y-axis (vertical) component. The x-axis component and the y-axis component specify respective horizontal and vertical offsets from a reference point, such as the lower left-hand corner of the grid. The x-axis component represents the loading of a power supply 212, 214, 216, 218, or 220, which is the percent of the rated output power that is produced by the power supply 212, 214, 216, 218, or 220 represented by the graph 300. The y-axis component represents power, expressed in watts, although in other embodiments any appropriate units may be used. Plotted on the graph 300 are two curves, an input power curve 312 and an output power curve 314. Each point on the respective curves 312 and 314 is uniquely identified by two numbers or coordinates: the value of the x-axis component and the value of the y-axis component, and the respective curves are represented by respective sets of their coordinates. Although curves comprise an infinite number of points, in practice the controller 144 uses a finite number of points and interpolation to create the curves or formulas from which to derive the curves. Thus, as represented by the input power curve 312, at each different loading point, the power supply receives a different input power value, and as represented by the output power curve 314, at each different loading point, the power supply produces a different output power value, in response to the input power value at the same loading point.

Each power supply 212, 214, 216, 218, or 220 in the computer system 100 or 132 may have the same or a different graph of loading data versus power data. The efficiency of the power supply 212, 214, 216, 218, or 220, at each loading point, is the value on the output power curve 314, at that loading point, divided by the value on the input power curve 312, at that same loading point, for any loading.

Figure 4:
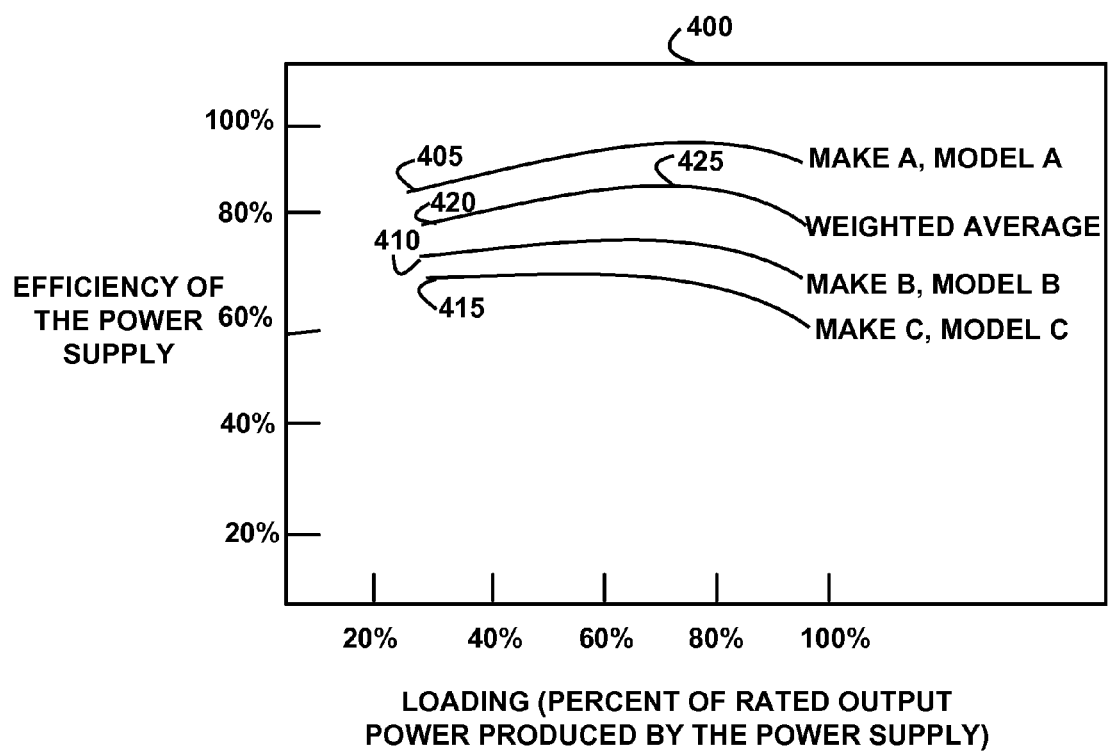
FIG. 4 depicts a graph of a plot of loading data versus efficiency data, according to an embodiment of the invention.

FIG. 4 depicts a graph 400 that plots loading data versus efficiency data for a variety of power supplies, according to an embodiment of the invention. The graph 400 represents a grid or a Cartesian coordinate system with an x-axis (horizontal) component and a y-axis (vertical) component. The x-axis component represents the loading of a power supply or power supplies, which is the percent of the rated output power that is produced by each (or a weighted average) of the power supplies represented by the graph 400. The y-axis component represents the efficiency of each power supply (or a weighted average of the power supplies) represented by the graph 400.

Plotted on the graph 400 are efficiency curves 405, 410, and 415 for three different power supplies (a power supply designated as "Make A, Model A," a power supply designated as "Make B, Model B," and a power supply designated as "Make C, Model C" and an efficiency curve 420 for the weighted average of the three efficiency curves 405, 410, and 415. Each point on the respective curves 405, 410, 415, and 420 is uniquely identified by two numbers or coordinates: the value of the x-axis component at that point and the value of the y-axis component at that point, and the respective curves are represented by respective sets of their coordinates.

The efficiency of a power supply, at each loading point, as represented by the efficiency curves 405, 410, and 415 is the value on the output power curve 314 (FIG. 3), at that loading point value, divided by the value on the input power curve 312 (FIG. 3), at that loading point value.

The weighted average curve 420 is the weighted average of the efficiency curves 405, 410, and 415. The point 425 on the weighted average curve 420 represents the weighted average loading of all power supplies in the computer system 100 or 132 at which the weighted average efficiency of all efficiencies of all power supplies in the computer system 100 or 132 is the highest. That is, at the point 425, the slope of the weighted average efficiency curve 420 is zero.

The controller 144 calculates the weighted average loading curve 420 by calculating the weighted average, at each loading point value, of the efficiencies of the power supplies (represented by the efficiency curves 405, 410, and 415) at the same loading point value. The controller 144 multiples the efficiency of each power supply, at each loading point value, by a respective weight assigned to the respective power supply, adds the products of the respective weights and respective efficiencies together, and divides the sum by the number of power supplies in the computer system 100 or 132. In an embodiment, the controller 144 selects the weights in proportion to the amount of output power provided by each respective power supply, as compared to the total sum of the output power of all power supplies that are active and enabled in the computer system 100 or 132, so that efficiencies of power supplies that provide more output power receive more weight in the weighted average, and efficiencies of power supplies that provide less output power receive less weight. For example, if a first power supply provides 15% of the total output power of the computer system 100 or 132, then the controller 144 assigns the first power supply a weight of 0.15, if a second power supply provides 20% of the output power of the computer system 100 or 132, then the controller 144 assigns the second power supply a weight of 0.2, and so on.

Figure 5:
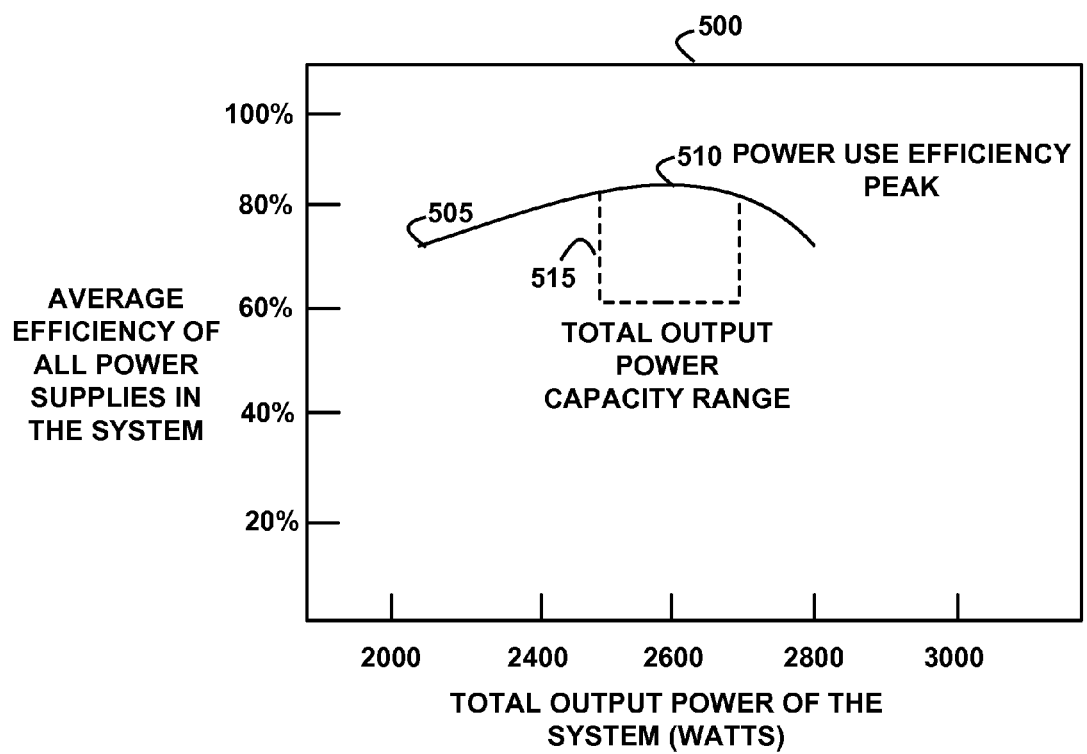
FIG. 5 depicts a graph of a plot of total output power versus average efficiency and denotes the total output power capacity range, according to an embodiment of the invention.

FIG. 5 depicts a graph 500 of a plot of total output power versus average efficiency and denotes the total output power capacity range, according to an embodiment of the invention. The graph 500 represents a grid or a Cartesian coordinate system with an x-axis (horizontal) component and a y-axis (vertical) component. The x-axis component represents the total output power of all power supplies (the sum of all the output power of all the power supplies) in the computer system 100 and/or 132 or over a plurality of computer systems. The y-axis component represents the average efficiency of all power supplies in the computer system 100 and/or 132, which is the weighted average of the efficiency of all of the power supplies in the computer system 100 and/or 132 or over a plurality of computer systems. The controller 144 calculates the weighted average of the efficiency of the power supplies, as previously described above for the weighted average efficiency curve 420 (FIG. 4) and calculates and plots each pair of weighted average efficiency values and the total output power of the system (the sum of the output power values of all enabled and not redundant power supplies) that is produced at those respective weighed average efficiency values on the curve 505. The controller 144 then calculates the highest weighed average efficiency on the curve 505 and determines the total output power that the sum of the power supplies produce at that highest weighted average efficiency, the combination of which are the coordinates of the power use efficiency peak 510. The power use efficiency peak 510 is also the point on the curve 505 at which the slope of the curve 505 is zero. The power use efficiency peak 510 has an identical average efficiency as the point 425 on the weighted average efficiency curve 420, as illustrated in FIG. 4.

The total output power capacity range 515 is a range delineated by minimum and maximum values of total output power that encompass or are around the total output power of the power use efficiency peak 510. That is, the minimum total output power of the total output power capacity range 515 is less than the total output power of the power use efficiency peak 510, and the maximum total output power of the total output power capacity range 515 is greater than the total output power of the power use efficiency peak 510.

FIG. 6 depicts a block diagram of power supply data 142, according to an embodiment of the invention. The power supply data 142 comprises any number of entries, each of which comprises a make/model field 610, an efficiency curve field 612, an enabled field 614, and a redundant field 616. The power supply data 142 further comprises a total output power capacity range field 620, a number of power supplies in the system field 622, a range threshold field 628, a first threshold number of times field 630, and a second threshold number of times field 632.

The make/model field 610, in each entry, uniquely identifies a power supply in the computer system 100 or 132. The efficiency curve field 612, in each entry, specifies a plurality of points or coordinates, each having a loading value and an efficiency value that specify the respective efficiency of the power supply at that respective loading value, for the power supply identified by the make/model field 610, in the same entry. In an embodiment, the content of the efficiency curve field 612, in each entry, is static and does not dynamically change over time. In various embodiments, the controller 144 reads or retrieves data for the efficiency curve field 612, in each entry, from the manufacturer of the make/model of power supply, from the user I/O device 121, or from the computer system 132 via the network 130. The controller 144 then stores the retrieved data to entries of the power supply data 142.

The enabled field 614, in each entry, specifies whether the power supply, identified in the make/model field 610, in the same entry, is enabled or not enabled. If the power supply is enabled, the power supply is turned on and is supplying electrical power to electronic components in the computer system 100 or 132. If the power supply is not enabled, then the power supply is turned off or is not supplying electrical power to electronic components in the computer system 100 or 132.

The redundant field 616, in each entry, specifies whether or not the power supply, identified by the make/model field 610 in the same entry, is redundant. If a power supply is redundant 616, then the power supply is available to be used if needed (as backup, in case another power supply fails), but the redundant power supply is not currently supplying electrical power to electronic components of the computer system 100 or 132. If the power supply is not redundant, then the power supply is enabled and is currently supplying power to electronic components in the computer system 100 or 132.

If the power supply is enabled and not redundant, then the controller 144 includes the coordinates of the efficiency curve 612, in the same entry, in the calculations that the controller 144 performs to determine the total output power capacity range 620. In an embodiment, if the power supply is redundant or not enabled, then the controller 144 does not include the coordinates of the efficiency curve 612, in the same entry, in the calculations that the controller 144 performs to determine the total output power capacity range 620. In an embodiment, if the power supply is redundant or not enabled, then the controller 144 does include the coordinates of the efficiency curve 612, in the same entry, in the calculations that the controller 144 performs to determine the total output power capacity range 620. In an embodiment, if the power supply is redundant or not enabled, then the controller 144 does include the efficiency curve 612 of redundant or not enabled power supplies in the calculation of the total output power capacity range 620 if the controller 144 uses the calculated total output power capacity range 620 to determine whether or not to enable or power on the redundant or not enabled power supply, but does not include the efficiency curve 612 of redundant or not enabled power supplies in the calculation of the total output power capacity range 620 if the controller does not use the total output power capacity range 620 to determine whether or not to enable or power on the redundant or not enabled power supply.

The total power capacity range field 620 specifies the minimum output power value and the maximum output power value that delineate the total output power capacity range 515 (FIG. 5). The minimum output power value of the total output power capacity range 620 is less than the total output power of the power use efficiency peak 510, and the maximum output power value of the total output power capacity range 620 is more than the total output power of the power use efficiency peak 510, so that the total output power capacity range 515, 620 is around, about, or encompasses the total output power of the power use efficiency peak 510.

The number of power supplies in the system field 622 specifies the total number of power supplies in the computer system 100 or 132 that are enabled and not redundant.

The range threshold field 628 specifies a minimum range threshold and a maximum range threshold that the controller 144 respectively subtracts from and adds to the total output power of the power use efficiency peak 510, to obtain the minimum value and the maximum value, respectively, of the total output power capacity range 620. The minimum range threshold may be the same or different from the maximum range threshold. In various embodiments, the controller 144 may receive the minimum range threshold and the maximum range threshold from a designer of the controller 144, from the user I/O device 121, or from the computer system 132 via the network 130. In another embodiment, the controller 144 may calculate the minimum range threshold and the maximum range threshold based on an efficiency loss threshold, e.g., on both sides of an optimal efficiency loss of the power supplies.

The first threshold number of times field 630 specifies a number of times that the total output power of the computer system 100 or 132 needs to be less than the minimum value of the total output power capacity range 515, 620, in order for the controller 144 to take action to bring the total output power of the computer system 100 or 132 to be within the total output power capacity range 515, 620. The second threshold number of times field 632 specifies a number of times that the total output power of the computer system 100 or 132 needs to be greater than the maximum value of the total output power capacity range 515, 620, in order for the controller 144 to take action to bring the total output power of the computer system 100 or 132 to be within the total output power capacity range 515, 620. In various embodiments, the controller 144 receives the first threshold number of times 630 and the second threshold number of times 632 from a designer of the controller 144, from the user I/O device 121, or from the computer system 132 via the network 130. In various embodiments, the first threshold number of times 630 and the second threshold number of times 632 may be the same or different from each other.

Figure 7:
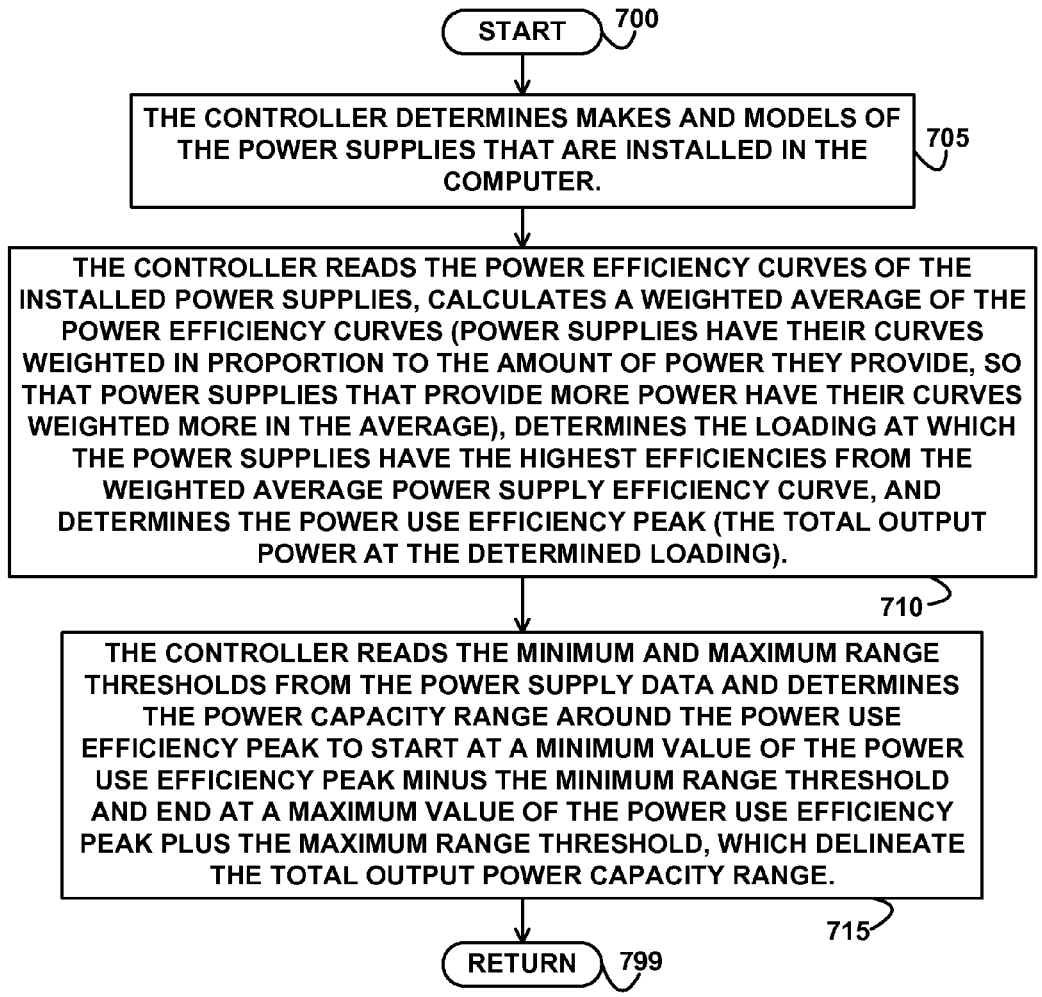
FIG. 7 depicts a flowchart of example processing for determining a power capacity range, according to an embodiment of the invention.

FIG. 7 depicts a flowchart of example processing for determining a power capacity range, according to an embodiment of the invention. The logic of FIG. 7 may be executed any number of times and at each computer system 100 or 132. For example, if the configuration of the power supplies in the computer system 100 or 132 changes (e.g. the enabled 614 or redundant 616 status of a power supply changes or power supplies are added or removed), the logic of FIG. 7 may be re-executed, or the logic of FIG. 7 may be re-executed periodically.

Control begins at block 700. Control then continues to block 705 where the controller 144 determines the makes and models or other identifiers of the power supplies that are installed in the computer system 100 or 132. In various embodiments, the controller 144 determines the makes and models of the installed power supplies by reading configuration data that describes the power supplies or by sending query commands to the power supplies.

Control then continues to block 710 where the controller 144 reads the power efficiency curves 612 of the installed power supplies, calculates a weighted average 425 of the power efficiency curves (power supplies have their curves weighted in proportion to the amount of power they provide, so that power supplies that provide more power have their curves weighted more in the average), determines the loading at which the power supplies have the highest weighted average efficiencies from the calculated weighted average power supply efficiency curve (the point 425), and determines the power use efficiency peak 510 (the sum of the output power provided by the power supplies at the determined loading).

Control then continues to block 715 where the controller 144 reads the minimum and maximum range thresholds 628 from the power supply data 142 and determines the total output power capacity range 620 around the power use efficiency peak 510 to start at a minimum value of the power use efficiency peak minus the minimum range threshold and end at a maximum value of the power use efficiency peak plus the maximum range threshold, which delineate the total output power capacity range 515. Control then continues to block 799 where the logic of FIG. 7 returns.

Figure 8:
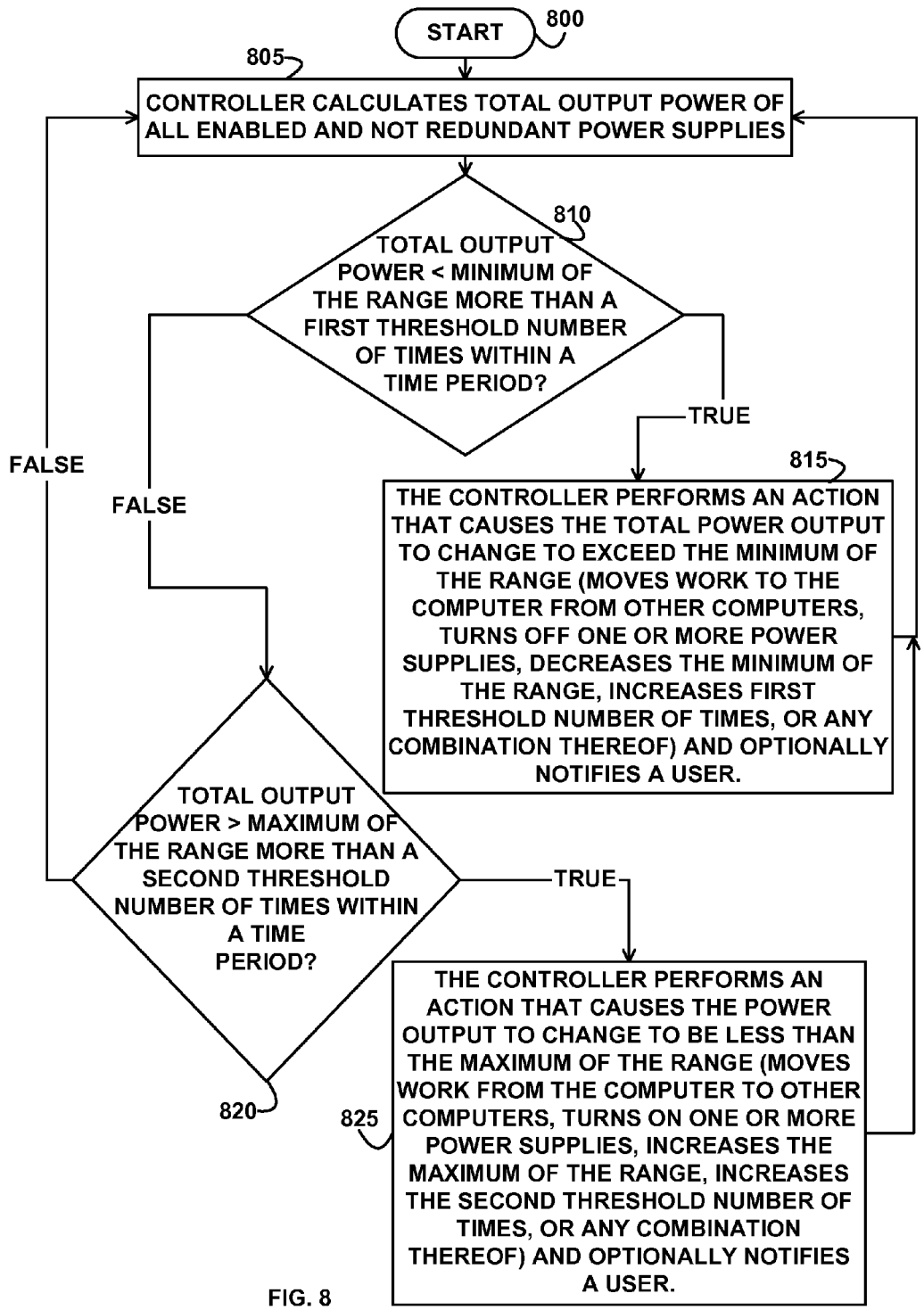
FIG. 8 depicts a flowchart of example processing for taking actions in response to comparisons of total output power to the power capacity range, according to an embodiment of the invention.

FIG. 8 depicts a flowchart of example processing for taking actions in response to comparisons of total output power to the minimum and maximum values of the power capacity range, according to an embodiment of the invention. Control begins at block 800. Control then continues to block 805 where the controller 144 reads, from the power supplies, the amount of output power of all power supplies in the computer system 100 or 132 that are enabled and not redundant and sums the amounts of output power into a total output power of all enabled and not redundant power supplies. The total output power may vary over time, so that each time the controller 144 calculates the total output power at block 805, the total output power may be the same or different. The controller 144 may store the amount of the calculated total output power to the memory 102. The controller 144 may optionally perform the logic of block 805 periodically, in response to configuration changes of the power supplies, or in response to a timer expiring or firing after a time period, in order to control the number of occurrences of execution of the logic of block 805.

Control then continues to block 810 where the controller 144 determines whether the summed total output power of all enabled and not redundant power supplies in the computer system 100 or 132 was less than the minimum value of the total output power capacity range for more than a first threshold number of times 630 (whether the total output power was less than the minimum value of the total output power capacity range on more than a first threshold number of times of the execution of block 805) within a time period. In various embodiments, the controller 144 receives a specification of the time period from a designer of the controller 144, from the user I/O device 121, or from the computer system 132 via the network 130.

If the determination at block 810 is true, then the summed total output power of all enabled and not redundant power supplies in the computer system 100 or 132 was less than the minimum value of the total output power capacity range for more than a first threshold number of times 630 within a time period (the total output power was less than the minimum value of the power capacity range on a number of occurrences that is more than a first threshold number of times of the execution of block 805 and those occurrences occurred within the time period), so control continues to block 815 where the controller 144 performs an action that causes the summed total power output of all enabled and not redundant power supplies in the computer system 100 or 132 to change to a new summed total power output that exceeds the minimum of the total output power capacity range. In various embodiments, the action comprises moving work 140 to the computer system 100 or 132 from other computers or starting additional work 140 executing on the computer system 100 or 132, turning off, disabling, or deactivating one or more power supplies in the computer system 100 or 132, decreasing the minimum value of the power capacity range, increasing the first threshold number of times 630, increasing the speed of the processor 101 or other processors such as a GPU (Graphical Processing Unit), increasing spin speeds of disk drives, enabling memory caches, increasing a frequency of scheduling of existing work on the computer system, requesting that the existing work in the computer system use more resources of the computer system, any other appropriate action, or any combination or multiple thereof. The controller 144 may optionally notify or send a message to a user indicating that the total output power was less than the minimum value of the total output power capacity range more than the first threshold number of times 630 within the time period. The message may further include an indication or description of the actions that the controller 144 took to increase the total output power. In various embodiments, the user may be a human user or any application or operating system executing on any computer system connected to the network 130. Increasing the frequency of scheduling of existing work on the computer system may cause the existing work to execute on the computer system more frequently than the existing work previously executed. Requesting that the existing work in the computer system use more resources of the computer system may cause the existing work to allocate more resources than the existing work previous used, such as increased processing power or memory. For example, a request to use more resources may cause a database execution engine to switch to a different access plan than a previously used access plan for the same query, which may build a different index or use a different access strategy, which uses more processing power or memory than the previous access plan. Control then returns to block 805 where the controller 144 again reads and calculates the total output power produced by all enabled and not redundant power supplies in the computer system 100 or 132, which may be the same or different from the total output power previously read and calculated, as previously described above.

If the determination at block 810 is false, then the summed total output power of all enabled and not redundant power supplies in the computer system 100 or 132 was less than the minimum value of the total output power capacity range for less than or equal to the first threshold number of times 630 (the total output power was less than the minimum value of the power capacity range on less than or equal to the first threshold number of times of the execution of block 805) within a time period, so control continues to block 820, where the controller 144 determines whether the summed total output power of all enabled and not redundant power supplies in the computer system 100 or 132 was greater than the maximum value of the total output power capacity range for more than a second threshold number of times 632 (whether the total output power was greater than the maximum value of the total output power capacity range on more than a second threshold number of times of the execution of block 805) within the time period.

If the determination at block 820 is true, then the summed total output power of all enabled and not redundant power supplies in the computer system 100 or 132 was greater than the maximum value of the total output power capacity range for more than a second threshold number of times 632 within the time period (the total output power was greater than the maximum value of the total output power capacity range on a number of occurrences that is more than a second threshold number of times of the execution of block 805 and those occurrences occurred within the time period), so control continues to block 825 where the controller 144 performs an action that causes the summed total power output of all enabled and not redundant power supplies in the computer system 100 or 132 to change to a new summed total power output that is less than or equal to the maximum of the total output power capacity range. In various embodiments, the action comprises moving work 140 from the computer system 100 or 132 to other computers or stopping work 140 from executing on the computer system 100 or 132, turning on, enabling, or activating one or more power supplies in the computer system 100 or 132 that the power supplies start to supply power to the electronic components of the computer system 100 or 132, increasing the maximum value of the power capacity range, increasing the second threshold number of times 632, decreasing the speed of the processor 101 or other processors such as a GPU (Graphical Processing Unit), decreasing spin speeds of disk drives, disabling memory caches, decreasing a frequency of scheduling of existing work on the computer system, requesting that the existing work in the computer system use less resources of the computer system, any other appropriate action, or any combination or multiple thereof. The controller 144 may optionally notify or send a message to a user indicating that the total output power was greater than the maximum value of the total output power capacity range more than the second threshold number of times 632 within the time period. The message may further include an indication or description of the actions that the controller 144 took to decrease the total output power. Decreasing the frequency of scheduling of existing work on the computer system may cause the existing work to execute on the computer system less frequently than the existing work previously executed. Requesting that the existing work in the computer system use less resources of the computer system may cause the existing work to allocate less resources than the existing work previous used, such as decreased processing power or memory. For example, a request to use less resources may cause a database execution engine to switch to a different access plan than a previously used access plan for the same query, which may build a different index or use a different access strategy, which uses less processing power or less memory than the previous access plan. Control then returns to block 805, as previously described above.

If the determination at block 820 is false, then the summed total output power of all enabled and not redundant power supplies in the computer system 100 or 132 was greater than the maximum value of the total output power capacity range for less than or equal to the second threshold number of times 632 (the total output power was greater than the maximum value of the total output power capacity range on less than or equal to the threshold number of times of the execution of block 805) within the time period, so control returns to block 805, as previously described above.

Figure 9:
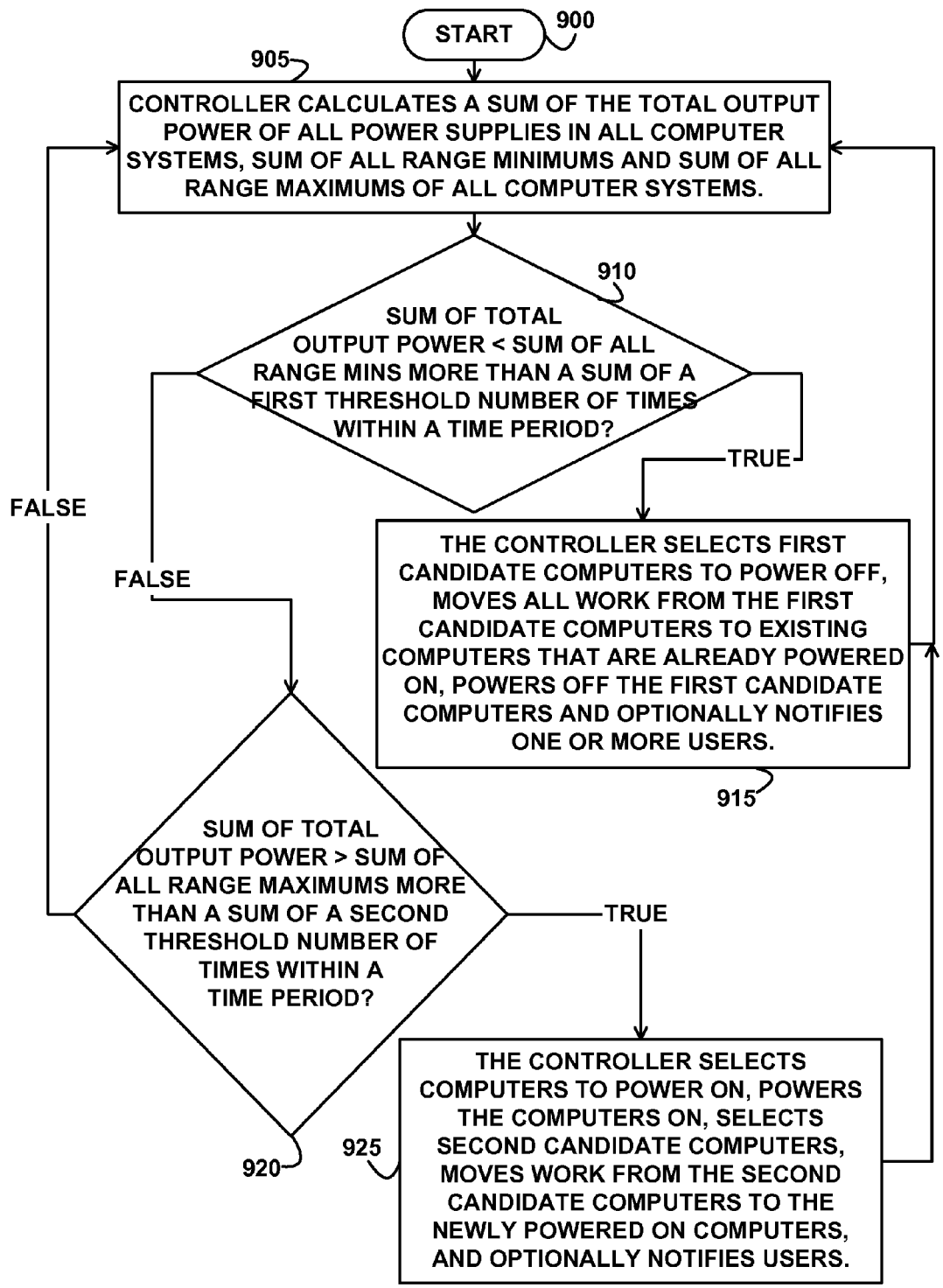
FIG. 9 depicts a flowchart of example processing for taking actions in response to comparisons of the sum total output power to the sums of minimums and maximums of power capacity ranges of multiple computers, according to an embodiment of the invention.

FIG. 9 depicts a flowchart of example processing for taking actions in response to comparisons of the sum total output power to the sums of minimums and maximums of power capacity ranges of multiple computers, according to an embodiment of the invention. The logic of FIGS. 8 and 9 may be performed concurrently or interleaved on the same or different processors via multi-programming, multi-processing, multi-threading, virtual processing, partitioning, virtual machine, or time slicing techniques.

Control begins at block 900. Control then continues to block 905 where the controller 144 reads and sums the amount of output power of all power supplies 212, 214, 216, 218, and 220, across multiple computer systems 100 and 132 connected to the network 130. The summed total output power across multiple computer systems 100 and 132 may vary over time, so that each time the controller 144 calculates the summed total output power at block 905, the summed total output power may be the same or different. The controller 144 further sums the minimum values of all the total output power capacity ranges 620 in different power supply data 142-1 and 142-2 across the multiple computer systems 100 and 132 to create a summed range minimum value. The controller 144 further sums the maximum values of all the total output power capacity ranges 620 across the multiple computer systems 100 and 132 to create a summed range maximum value. The controller 144 may optionally perform the logic of block 905 periodically, in response to a timer expiring or firing after a time period, in response to configuration changes, or in response to computer systems powering on, powering off, connecting to the network 130, or disconnecting from the network 130, in order to control the number of occurrences of execution of the logic of block 905.

Control then continues to block 910 where the controller 144 determines whether the summed total output power across multiple computer systems 100 and 132 is less than the summed range minimum value of multiple computer systems 100 and 132 on a number of occurrences that is more than a sum of the first threshold number of times over the multiple computer systems. If the determination at block 910 is true, then the summed total output power across multiple computer systems 100 and 132 is less than the summed range minimum value of multiple computer systems 100 and 132 on more than a sum of the first threshold number of times over the multiple computer systems, so control continues to block 915 where the controller 144 selects first candidate computers to power off, moves all work from the first candidate computers to existing computers connected to the network 130 that are already powered on (starts the work executing on the existing computers), powers off the first candidate computers, and optionally notifies one or more users. In various embodiments, the controller 144 selects the first candidate computers to be those computers that have respective total output power values that are all smaller than their respective range minimum values, that have the largest difference between their total output power values and their respective range minimum values, that have the smallest power use efficiency peaks 510, that have the smallest average efficiency of power supplies, that have the smallest loading, that have the lowest assigned priority, or any combination thereof. In another embodiment, the controller 144 uses any appropriate technique to select the first candidate computers. In various embodiments, the controller 144 selects the existing computers that receive the work to be those computers that have respective total output power values that are all within their respective total output power capacity ranges, that have the largest power use efficiency peaks 510, that have the largest average efficiency of power supplies, that have the largest loading, that have the highest assigned priority, or any combination thereof. In another embodiment, the controller 144 uses any appropriate technique to select the existing computers. The controller 144 may optionally notify or send a message to one or more users, indicating that the summed total output power across multiple computer systems was less than the summed range minimum value of multiple computer systems. The message may further include an indication or description of the actions that the controller 144 took to cause the summed total output power to be more than the summed range minimum value over the multiple computer systems. In various embodiments, the user or users may be a human user or any application or operating system executing on any computer system connected to the network 130.

Control then returns to block 905 where the controller 144 again calculates the summed total output power, the summed range minimum value, and the summed range maximum value, which may be the same or different from the sums previously calculated, as previously described above.

If the determination at block 910 is false, then the summed total output power across multiple computer systems 100 and 132 was less than the summed range minimum value of multiple computer systems 100 and 132 on a number of occurrences that is less than or equal to the sum of the first threshold number of times, so control continues to block 920, where the controller 144 determines whether the summed total output power across multiple computer systems 100 and 132 is greater than the summed range maximum value of multiple computer systems 100 and 132 on a number of occurrences that is more than the sum of the second threshold number of times 632 over the multiple computer systems.

If the determination at block 920 is true, then the summed total output power across multiple computer systems 100 and 132 is greater than the summed range maximum value of multiple computer systems 100 and 132 on a number of occurrences that is more than the sum of the second threshold number of times 632 over the multiple computer systems, so control continues to block 925 where the controller 144 selects computers to power on, powers on the selected computers, selects second candidate computers to move work from, moves some or all work from the second candidate computers to the newly powered on computers, and optionally notifies one or more users. If the controller 144 moves all work from the second candidate computers, the controller 144 subsequently powers off the second candidate computers. In various embodiments, the controller 144 selects the second candidate computers to be those computers that have respective total output power values that are all larger than their respective range maximum values, that have the largest difference between their total output power values and their respective range maximum values, that have the smallest power use efficiency peaks 510, that have the smallest average efficiency of power supplies, that have the smallest loading, that have the lowest assigned priority, or any combination thereof. In another embodiment, the controller 144 uses any appropriate technique to select the second candidate computers. In various embodiments, the controller 144 selects the computers that receive the work to be those computers that have the largest power use efficiency peaks 510, that have the largest average efficiency of power supplies, that have the highest assigned priority, or any combination thereof. In another embodiment, the controller 144 uses any appropriate technique to select the computers to receive the work. The controller 144 may optionally notify or send a message to a user or users, indicating that the summed total output power across multiple computer systems was greater than the summed range maximum value of multiple computer systems 100 and 132. The message may further include an indication or description of the actions that the controller 144 took to cause the summed total output power to be less than the summed range maximum value over the multiple computer systems. In various embodiments, the user or users may be a human user or any application or operating system executing on any computer system connected to the network 130. Control then returns to block 905, as previously described above.

If the determination at block 920 is false, then the summed total output power across multiple computer systems 100 and 132 was greater than the summed range maximum value of multiple computer systems 100 and 132 on a number of occurrences that was less than or equal to the sum of the threshold number of times 632 over the multiple computer systems, so control returns to block 905, as previously described above.

In this way, in an embodiment, the controller 144 tends to keep the total output power of power supplies of the computer system 100 or 132 within a total output power capacity range 515, which is the range of total output power at which the combination of the power supplies 212, 214, 216, 218, or 220 of the computer system 100 or 132 are most efficient, which tends to save energy and money. In other embodiments, the controller 144 tends to keep the sum of the total output power of power supplies of a plurality of computer systems within a sum of the total output power capacity ranges of the computer systems.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
   determining, on a processor, a power capacity range around a power use efficiency peak of a computer system;
   if a total output power provided to the computer system is less than a minimum value of the power capacity range on a number of occurrences more than a first threshold number of times within a time period, performing a first action that causes the total output power provided to the computer system to change to exceed the minimum value of the power capacity range; and
   if the total output power provided to the computer system is greater than a maximum value of the power capacity range on a number of occurrences more than a second threshold number of times within the time period, performing a second action that causes the total output power provided to the computer system to change to be less than the maximum value of the power capacity range,
   wherein the first action is selected from a group consisting of: decreasing the minimum value of the power capacity range and increasing the first threshold number of times within the time period, and
   wherein the second action is selected from a group consisting of: increasing the maximum value of the power capacity range and increasing the second threshold number of times within the time period.

2. The method of claim 1, wherein the determining the power capacity range around the power use efficiency peak of a computer system further comprises:
calculating a weighted average power efficiency curve of a plurality of power supplies that provide the total output power of the computer system.

3. The method of claim 2, wherein the calculating the weighted average power efficiency curve further comprises:
assigning a respective weight to each power efficiency curve of each of the plurality of power supplies in proportion to an amount of power that each of the plurality of power supplies provides.

4. The method of claim 3, further comprising:
determining a determined loading on the weighted average power efficiency curve at which the plurality of power supplies has a highest efficiency.

5. The method of claim 4, further comprising:
determining the power use efficiency peak to be a total output power that exists at the determined loading.

6. The method of claim 5, further comprising:
calculating the minimum value of the power capacity range to be the power use efficiency peak minus a minimum range threshold;
calculating the maximum value of the power capacity range to be the power use efficiency peak plus a maximum range threshold, wherein the minimum value of the power capacity range and the maximum value of the power capacity range delineate the power capacity range, wherein the minimum range threshold and the maximum range threshold are different;
if a sum of the total output power of a plurality of computers is less than a sum of a plurality of minimum values of the power capacity range of the plurality of computers, selecting a first candidate computer of the plurality of computers, moving work from the first candidate computer to a first computer that is already powered on, and powering off the first candidate computer; and
if the sum of the total output power of a plurality of computers is greater than a sum of a plurality of maximum values of the power capacity range of the plurality of computers, selecting a second candidate computer of the plurality of computers, powering on a second computer, and moving work from the second candidate computer to the second computer.

7. A computer-readable storage medium encoded with instructions, wherein the instructions when executed comprise:
determining a power capacity range around a power use efficiency peak of a computer system, wherein the determining the power capacity range around the power use efficiency peak of a computer system further comprises calculating a weighted average power efficiency curve of a plurality of power supplies that provide the total output power of the computer system, wherein the calculating the weighted average power efficiency curve further comprises assigning a respective weight to each power efficiency curve of each of the plurality of power supplies in proportion to an amount of power that each of the plurality of power supplies provides;
if a total output power provided to the computer system is less than a minimum value of the power capacity range on a number of occurrences more than a first threshold number of times within a time period, performing a first action that causes the total output power provided to the computer system to change to exceed the minimum value of the power capacity range; and
if the total output power provided to the computer system is greater than a maximum value of the power capacity range on a number of occurrences more than a second threshold number of times within the time period, performing a second action that causes the total output power provided to the computer system to change to be less than the maximum value of the power capacity range,
wherein the first action is selected from a group consisting of: decreasing the minimum value of the power capacity range and increasing the first threshold number of times within the time period, and
wherein the second action is selected from a group consisting of: increasing the maximum value of the power capacity range and increasing the second threshold number of times within the time period.

8. The computer-readable storage medium of claim 7, further comprising:
determining a determined loading on the weighted average power efficiency curve at which the plurality of power supplies has a highest efficiency.

9. The computer-readable storage medium of claim 8, further comprising:
determining the power use efficiency peak to be a total output power that exists at the determined loading.

10. The computer-readable storage medium of claim 9, further comprising:
calculating the minimum value of the power capacity range to be the power use efficiency peak minus a minimum range threshold;
calculating the maximum value of the power capacity range to be the power use efficiency peak plus a maximum range threshold, wherein the minimum value of the power capacity range and the maximum value of the power capacity range delineate the power capacity range, wherein the minimum range threshold and the maximum range threshold are different;
if a sum of the total output power of a plurality of computers is less than a sum of a plurality of minimum values of the power capacity range of the plurality of computers, selecting a first candidate computer of the plurality of computers, moving work from the first candidate computer to a first computer that is already powered on, and powering off the first candidate computer; and
if the sum of the total output power of a plurality of computers is greater than a sum of a plurality of maximum values of the power capacity range of the plurality of computers, selecting a second candidate computer of the plurality of computers, powering on a second computer, and moving work from the second candidate computer to the second computer.

11. A computer system comprising:
a processor; and
memory communicatively coupled to the processor, wherein the memory is encoded with instructions, and wherein the instructions when executed on the processor comprise:
determining a power capacity range around a power use efficiency peak of a computer system, wherein the determining the power capacity range around the power use efficiency peak of the computer system further comprises calculating a weighted average power efficiency curve of a plurality of power supplies that provide the total output power of the computer system, wherein the calculating the weighted average power efficiency curve further comprises assigning a respective weight to each power efficiency curve of each of the plurality of power supplies in proportion to an amount of power that each of the plurality of power supplies provides, if a total output power provided to the computer system is less than a minimum value of the power capacity range on a number of occurrences more than a first threshold number of times within a time period, performing a first action that causes the total output power provided to the computer system to change to exceed the minimum value of the power capacity range, and if the total output power provided to the computer system is greater than a maximum value of the power capacity range on a number of occurrences more than a second threshold number of times within the time period, performing a second action that causes the total output power provided to the computer system to change to be less than the maximum value of the power capacity range, wherein the first action is selected from a group consisting of: decreasing the minimum value of the power capacity range and increasing the first threshold number of times within the time period, and wherein the second action is selected from a group consisting of: increasing the maximum value of the power capacity range and increasing the second threshold number of times within the time period.

12. The computer system of claim 11, wherein the instructions further comprise:
determining a determined loading on the weighted average power efficiency curve at which the plurality of power supplies has a highest efficiency.

13. The computer system of claim 12, wherein the instructions further comprise:
determining the power use efficiency peak to be a total output power that exists at the determined loading.

14. The computer system of claim 13, wherein the instructions further comprise:
calculating the minimum value of the power capacity range to be the power use efficiency peak minus a minimum range threshold;
calculating the maximum value of the power capacity range to be the power use efficiency peak plus a maximum range threshold, wherein the minimum value of the power capacity range and the maximum value of the power capacity range delineate the power capacity range, wherein the minimum range threshold and the maximum range threshold are different;
if a sum of the total output power of a plurality of computers is less than a sum of a plurality of minimum values of the power capacity range of the plurality of computers, selecting a first candidate computer of the plurality of computers, moving work from the first candidate computer to a first computer that is already powered on, and powering off the first candidate computer; and
if the sum of the total output power of a plurality of computers is greater than a sum of a plurality of maximum values of the power capacity range of the plurality of computers, selecting a second candidate computer of the plurality of computers, powering on a second computer, and moving work from the second candidate computer to the second computer.

* * * * *